Feb. 18, 1969 J. HESKES 3,427,740
PERPETUAL CALENDAR
Filed Nov. 22, 1966

INVENTOR.
JACOB HESKES 3,427,740

PERPETUAL CALENDAR

Jacob Heskes, 90—15 68th Ave.,
Forest Hills, N.Y. 11375

Filed Nov. 22, 1966, Ser. No. 596,216
U.S. Cl. 40—109 1 Claim
Int. Cl. G09d 3/10

ABSTRACT OF THE DISCLOSURE

A perpetual slide calendar comprising an inner member bearing rows and columns of daily and yearly date indicia and horizontally slidable with respect to an outer member having one or more century-representing vertical slots and seven windows spaced one column of date indicia apart horizontally and one row of date indicia apart vertically in any one tier along one or more tiers; in sweeping over said daily date indicia, said windows exposing seven constantly changing monthly calendars each starting on a different day of the week in any simultaneous display, fixed monthly appellations applied to said windows relating said calendars displayed to the yearly date indicia exposed in the century slots.

My invention relates to calendars and more particularly relates to perpetual calendars, i.e. calendars which can be manipulated to provide a time record measured in many years rather than days, weeks or months only.

It is an object of my invention to provide a new and improved perpetual calendar wherein two members having printed indicia are utilized, one member having windows and being stationary, the other member having no windows and being slidable within the other.

Another object of my invention is to provide a new and improved perpetual calendar of the character indicated wherein the members can be adapted in size and shape to fit into a wallet or to take the shape of a ruler or can assume a wide variety of other shapes.

Still another object of my invention is to provide a new and improved perpetual calendar of the character indicated which can be manufactured easily and inexpensively in a variety of different materials such as metal, plastic, wood and cardboard.

Figures 1, 2:
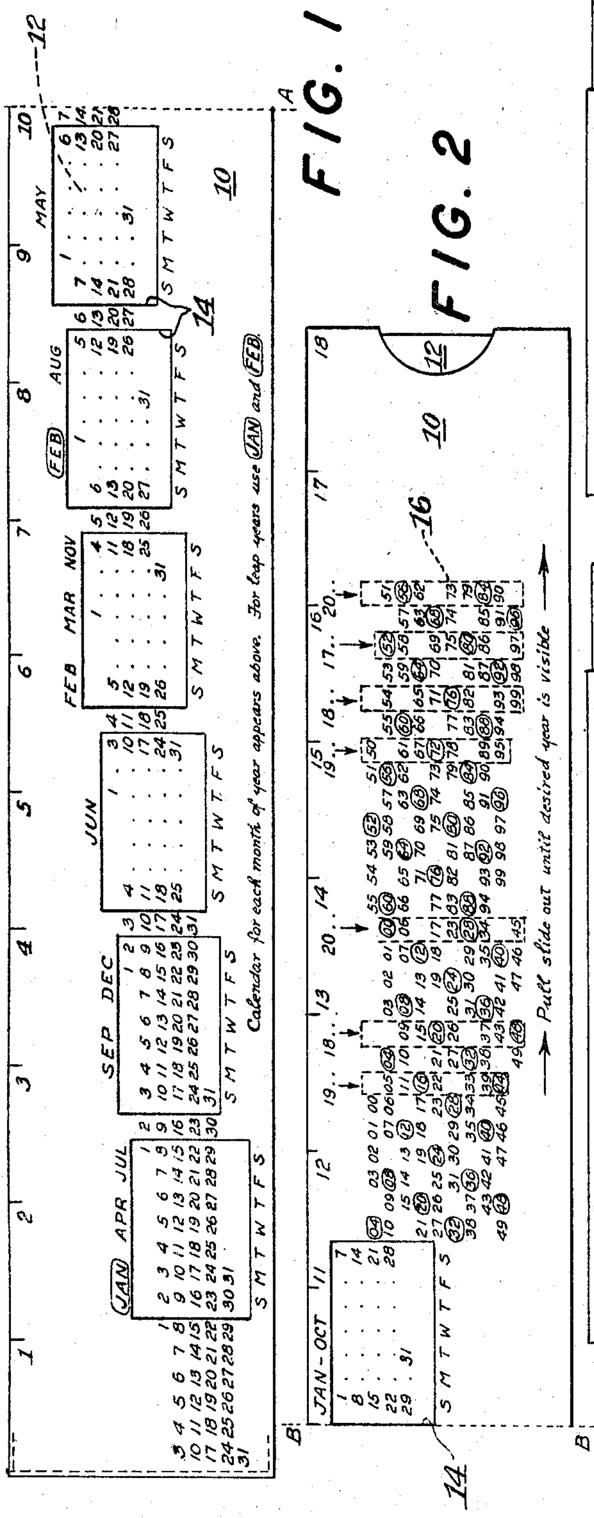
Figures 3, 4:
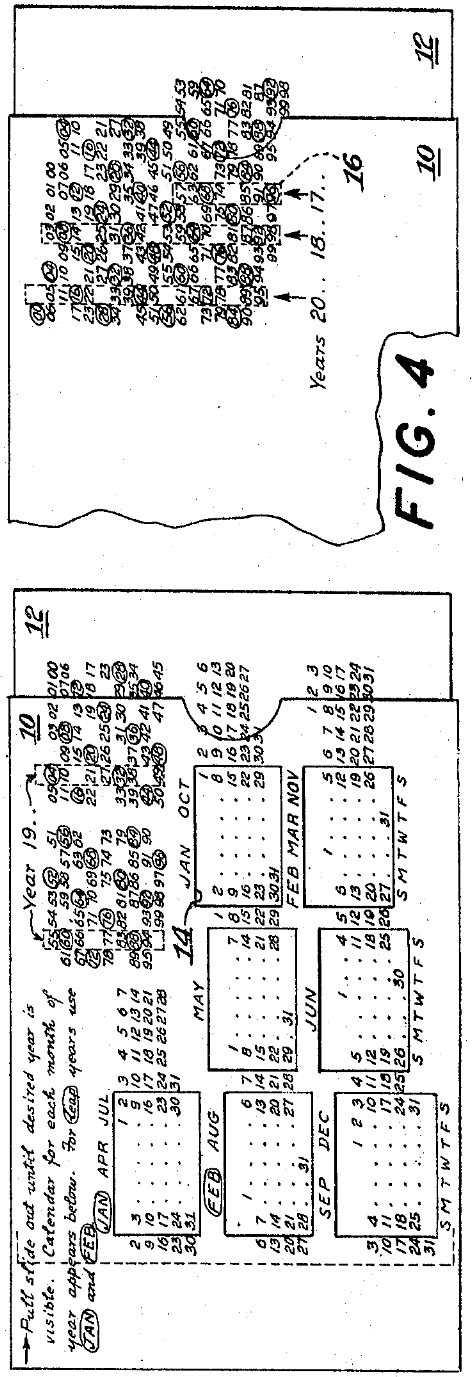

All of the foregoing and still further objects and advantages of my invention will now be explained with reference both to this specification and to the accompanying drawings wherein:

FIGS. 1 and 2 each show mating half sections in front plan of a perpetual calendar in accordance with my invention which has the shape of a ruler;

FIG. 3 is a front plan view of a perpetual calendar in accordance with my invention in wallet card form; and FIG. 4 is a rear plan view of the structure shown in FIG. 3.

It is known that the beginning day of the week for any month of a particular year is always in fixed relationship to those of the other months of the year. In any year the months in each group in the following sequence begin a day of the week later than the pertinent months in the previous group:

September, December
Leap year January, April, July
Ordinary year January, October
May
Leap year February, August
Ordinary year February, March, November
June
September, December Since a year can only start on one of seven days of the week there are, expressed in days of the week, only seven different sequences of these monthly relationships, or annual calendars, possible. My invention displays each of these annual calendars in full, and simultaneously the full numbers of all the years to which the calendar pertains, as is fully explained hereafter.

Referring now to FIGS. 1 and 2, there is shown a hollow sleeve member 10 with a plurality of windows 14 in the front surface thereof and a slide member 12 with printed indicia (dates) on its front surface. For the purpose of clarification, the numbers on the member 12 which are actually hidden or concealed by the solid front surface of the sleeve member 10, i.e. are not displayed within the windows, are shown in the drawings and thus appear to be carried on this front surface of sleeve 10.

On the slide member 12 is an arrangement of 61 columns of daily dates consisting of rows of dates running from 1 to 31, or less as necessary, each date 7 days displaced from that on the adjacent rows above and below, so that a window seven columns wide and moving with respect to the arrangement, will continuously frame a monthly calendar.

The sleeve member has seven cut out sections or windows, the spacing between each two adjacent windows being equal to the spacing of one column of dates on the slide member. Moreover, each window can accommodate seven columns of dates (one for each day of the week) arranged into a maximum of six rows, thus displaying a month of dates. The top of each window is displaced one row from that of each of the adjacent windows. As shown in FIG. 1, the top of each window is stepped up one row as compared to the top of the immediately adjacent window to the left and is stepped down one row as compared to the top of the immediately adjacent window to the right.

The one column spacing together with this stepping compensation has the effect of framing 7 monthly calendars each starting one day of the week earlier than the next, thus displaying simultaneously all possible monthly calendars (or all the notes of a musical scale as it were). Each window may now be designated with the names of appropriate months. Any window may be designated with the name of any month provided the proper displacement of months is then followed on the other windows (much as a melody may be played starting on any note of the piano by using a different key). For example, if the first window of the ruler style were designated *Jun* instead of (*Jan*) *Apr Jul,* the next window to the right would be *Feb Mar Nov* instead of *Sep Dec.* The completion of the cycle of the date arrangement may also be noted in that the *Jan Oct* calendar begins to repeat itself in the second column to the left of the first window.

To obtain the six other possible annual calendars the slide is now moved through six positions to the right. In each position the starting day of the week of the monthly calendar in each window changes, but always in its same fixed relationship to each of the others, thus maintaining the validity of the monthly designations with which the windows are headed. It should be noted that each window requires a date arrangement on the slide 13 columns wide to permit it to cycle through all seven starting day variations. The stepped-down windows are my *novel* means of permitting adjacent windows to use common, overlapping date arrangements on the slide, thus conserving space enormously. Only 61 columns of dates are necessary to display 49 columns variably.

The explanation of the yearly date arrangement is as follows:

The starting days of the week (and consequently all subsequent days) of all years within a century are in fixed relationship to each other. A year having 365 days has one day more than 52 weeks. Consequently such a year starts one day of the week later than the previous year, as can be noted throughout the yearly arrangement. Since a leap year has 366, or two more days than 52 weeks, all dates after Feb. 29 will be two days of the week later than the previous year. In order to accommodate this fact the circled leap year indicators in the yearly sequence are moved up two days from the previous year and provision is then made by means of the circled monthly calendar indicators for January and February of leap years to start earlier by one day of the two days. In the ruler style (FIGS. 1 and 2) it can be noted that leap year (*Feb*) starts on a Tuesday, ordinary year *Feb* on a Wednesday, leap year (*Jan*) on a Saturday, ordinary year *Jan* on a Sunday. A similar one day difference can be noted in the wallet card (FIG. 3).

The sleeve member has (FIG. 2) seven horizontally spaced vertical century slots 16 each accommodating only a single column of two digit numbers. These are used to permit the selection of any one year calendar in any of a plurality of centuries as explained in the following.

The starting days of the week of the first years of centuries are also in fixed relationship to each other. Each ordinary century consists of 24 leap years and 76 ordinary years for a total of 36,524 days, or 5,217 weeks and 5 days. Consequently each ordinary century starts 5 days of the week later than the previous century—or two days earlier and its slot is correspondingly spaced. A century such as the 21st, whose centesimal year is a leap year by reason of it being divisible by 400, has an extra day. Since all dates within it after Feb. 29 of its first year will be six days of the week later than the corresponding dates in the previous century, its slot is six columns removed from the 19— slot. Provision is also made for the column of yearly indicia containing a leap (00) centesimal year indicator to be exposed only by the 20— slot. To align the yearly indicators with the annual calendars it is only necessary to make a century slot over a column which contains the indicator for a year known to correspond to the annual calendar displayed. The other century slots may then be made in relation to the first by applying the principles set forth above.

The fixed rhythmic displacement and repetition of the calendars for the years within a century is embodied in the yearly date arrangement. The overlying fixed displacement of the calendars in corresponding years in different centuries is accommodated by the century slots. This arrangement permits several century slots to overlap their sweeps across common yearly indicators, thus greatly conserving space. It also lends itself to a potentially endless fabric of yearly date indicators. The same columnar sequence of yearly indicators, with the one centesimal leap year indicator exception noted above, repeats itself every seven columns, stepped up one line.

The endless nature of the yearly indicator arrangement permits it to be sectioned and repeated as desired. For example, in the ruler the first half of all centuries is separated from the second half. In the wallet card the 18th, 19th, and 21st centuries are made to appear on the rear, the 20th on the front, and this latter its first half split from the second. The 18th century is made to start with 1753 in deference to the year of adoption of the calendar in America.

It is possible by enlarging the fabric of the yearly indicators to accommodate slots for as many centuries as desired. In the embodiments I have shown only the 18th through the 21st centuries. The full number of every year ad infinitum having the same annual calendar can be simultaneously displayed if desired.

Referring now to FIGS. 3 and 4 the same principles are used as in FIGS. 1 and 2 except that in the wallet card the windows are rearranged in three tiers and the daily date arrangement is sectioned and rearranged accordingly. It may be noted that *Sep Dec,* instead of following (*Jan*) *Apr Jul,* as in the ruler, commence the third tier, and that (*Feb*) *Aug,* instead of following *Feb Mar Nov* as in the ruler, commence the second tier. Five columns of daily dates previously shared by adjacent windows at each of the two points of sectioning, are of necessity repeated, raising the number of columns of dates required to achieve this shape and arrangement from 61 to 71.

The inch markings shown at the top of member 10 permit my calendar to be used as a ruler. However, these markings are not necessary and can be eliminated.

While I have described my invention with particular reference to the drawings, my protection is to be limited only by the terms of the claim which follows.

Having thus described my invention, I claim as new and desire to secure by Letters Patent:

1. A perpetual slide calendar comprising an inner member and an outer member, said inner member being horizontally slidable with respect to said outer member and having daily date indicia arranged in horizontal rows and vertical columns imprinted on a portion of its surface along at least one tier, said daily date indicia being continuous in any one tier, a portion of the surface of said outer member being provided with seven rectangular windows arranged along at least one tier, each of said windows displaying selected portions of said daily date indicia seven columns wide arranged in a maximum of six rows, the spacing between adjacent windows in any one tier being equal to one column of date indicia on the inner member, the top of each window in any one tier being upwardly displaced with reference to the top of the window immediately to the left on the same tier by a space equal to one row of date indicia on the inner member, each of said windows bearing different fixed monthly appellations in consonance with the relative starting day of the week of each of the months; a portion of the surface of said outer member also being provided with at least one century-representing vertical slot accommodating one column of double digit numbers, a plurality of such slots being horizontally displaced in consonance with the starting day of the week of selected centuries, said vertical slots each exposing selected portions of double digit yearly date indicia also imprinted on a portion of the surface of said inner member.

References Cited

UNITED STATES PATENTS 2,575,555 11/1951 La Plante ---------- 40—109

FOREIGN PATENTS 802,106 2/1951 Germany.

EUGENE R. CAPOZIO, *Primary Examiner.*

W. J. CONTRERAS, *Assistant Examiner.*